UNITED STATES PATENT OFFICE.

IWAN OSTROMISLENSKY, OF PETROGRAD, RUSSIA, ASSIGNOR, BY MESNE ASSIGNMENTS, TO NEW YORK BELTING AND PACKING COMPANY, A CORPORATION OF NEW YORK.

PROCESS FOR VULCANIZING RUBBER AND PRODUCT OBTAINED THEREBY.

1,342,458.        Specification of Letters Patent.        Patented June 8, 1920.

No Drawing. Original application filed July 29, 1916, Serial No. 112,187. Divided and this application filed November 24, 1916. Serial No. 133,134.

*To all whom it may concern:*

Be it known that I, IWAN OSTROMISLENSKY, a subject of the Czar of Russia, residing at Petrograd, Russia, have invented certain new and useful Improvements in Processes for Vulcanizing Rubber and Products Obtained Thereby, of which the following is a full, clear, and exact description.

This invention relates to processes for vulcanizing rubber or similar material, such as gutta-percha, balata, synthetic rubber, and materials commonly classed under the term " rubber," and to the products obtained thereby. It is more particularly directed to a process in which sulfur or sulfur compounds as vulcanizing ingredients are partially replaced by another or other vulcanizing agents; and to the products resulting therefrom.

The vulcanization of rubber, according to the practice heretofore followed, is performed by the use alone of sulfur or a sulfur containing compound. The process is open, however, to the objection among others that unavoidable excess of sulfur sometimes occurs in articles so vulcanized to the detriment thereof—for example, the color of the article is affected and the life shortened— to remedy which a supplementary process of airing must be resorted to which lengthens the process of cure. Further, articles vulcanized by sulfur age somewhat rapidly particularly under heat.

The principal object of the present invention accordingly is to provide a simple and efficient process which shall do away with the disadvantages noted in the use of sulfur. Another object is to provide a series of products having a wide range of desirable physical characteristics employing a vulcanizing agent or agents in combination with sulfur.

This is a division of my co-pending application Serial No. 112,187, filed July 29, 1916.

In carrying out the process in its preferred form 10 grams of rubber are mixed with 2 grams of a mixture of equal parts of sulfur and tri-nitro-benzene, and 3 grams of lead oxid. Mixing is carried on in the usual manner. Thereafter the mixture is placed in a metal mold and heated by the application of steam of a pressure of approximately 45 pounds for a period of 30 minutes under the pressure of the vulcanizing press, at the end of which period vulcanization is found to be complete.

The rubber produced by the process is soft and is generally applicable where soft rubber produced by sulfur vulcanization has been used. The product possesses high tensile strength among other desirable physical characteristics and shows a marked improvement in ageing compared with sulfur cured rubber particularly under heat. Further, the product is free from bloom and other undesirable characteristics occurring when an excess of sulfur is present in sulfur-cured articles.

It will be observed that the process mentioned is applicable not only to natural rubber but may be applied to various synthetic rubbers.

As many apparently widely different embodiments of this invention could be made without departing from the spirit thereof, it is to be understood that I do not intend to limit myself to the specific form of the invention as set forth except as indicated in the appended claims.

Having thus described my invention what I claim and desire to protect by Letters Patent is:

1. A process for treating rubber or similar material, which comprises subjecting the rubber to the action of sulfur and an organic vulcanizing agent containing oxygen and inducing vulcanization to take place under the action thereof.

2. A process for treating rubber or similar material, which comprises subjecting the rubber to sulfur and a vulcanizing compound containing oxygen and nitrogen and inducing vulcanization to take place under the action thereof.

3. A process for treating rubber or similar material, which comprises adding sulfur and an organic nitro-compound to said rubber and vulcanizing the rubber under the action thereof.

4. A process for treating rubber or similar material, which comprises adding sulfur and a tri-nitro-benzene to said rubber and inducing vulcanization to take place under the action thereof.

5. A process for treating rubber or similar material, which comprises subjecting the rubber to sulfur and a vulcanizing agent containing oxygen in the presence of an accelerating agent and inducing vulcanization to take place under the action thereof.

6. A process for treating rubber or similar material, which comprises subjecting the rubber to sulfur and a vulcanizing agent containing oxygen in the presence of a metallic oxid and inducing vulcanization to take place under the action thereof.

7. A process for treating rubber or similar material, which comprises adding sulfur, a nitro-compound and a metallic oxid to said rubber and inducing vulcanization to take place under the action thereof.

8. A process for treating rubber or similar material, which comprises adding sulfur, a tri-nitro-benzene, and lead oxid to said rubber and inducing vulcanization to take place under the action thereof.

9. As a new compound a vulcanized rubber comprising products of the action of sulfur and an organic vulcanizing agent.

10. As a new compound a vulcanized rubber comprising products of the action of sulfur and a vulcanizing agent containing nitrogen and oxygen.

11. As a new compound a vulcanized rubber comprising products of the action of sulfur and a nitro-compound.

12. A process for treating rubber or similar material which comprises subjecting rubber to sulfur and a vulcanizing agent of the aromatic series and inducing vulcanization to take place under the action thereof.

13. As a new compound a vulcanized rubber comprising products of the action of sulfur and a vulcanizing agent of the aromatic series.

14. As a new compound a vulcanized rubber comprising products of the action of sulfur, and a nitro benzene.

15. As a new compound a vulcanized rubber comprising products of the action of sulfur, a nitro benzene, and a metallic oxid.

16. As a new compound a vulcanized rubber comprising products of the action of sulfur, a nitro benzene, and lead oxid.

Signed at Petrograd, Russia, this 17 day of November, 1916.

IWAN OSTROMISLENSKY.